United States Patent [19]
Kanevsky et al.

[11] Patent Number: 6,104,989
[45] Date of Patent: Aug. 15, 2000

[54] REAL TIME DETECTION OF TOPICAL CHANGES AND TOPIC IDENTIFICATION VIA LIKELIHOOD BASED METHODS

[75] Inventors: Dimitri Kanevsky, Ossining; Emmanuel Yashchin, Yorktown Heights, both of N.Y.

[73] Assignee: International Business Machines Corporation, Armonk, N.Y.

[21] Appl. No.: 09/124,075

[22] Filed: Jul. 29, 1998

[51] Int. Cl.[7] .............................. G06F 17/27; G06F 17/28
[52] U.S. Cl. ................................. 704/9; 704/7; 704/257; 707/2
[58] Field of Search .................................. 704/1, 9, 10, 2, 704/8, 4, 5, 7, 257, 277; 707/530, 531, 532, 1, 2, 3, 4, 5, 6, 100, 101, 102, 103, 104, 500, 501; 434/156, 167, 169

[56] References Cited

U.S. PATENT DOCUMENTS

| | | |
|---|---|---|
| 5,625,748 | 4/1997 | McDonough et al. .................. 704/251 |
| 5,708,822 | 1/1998 | Wical .......................................... 704/1 |
| 5,708,825 | 1/1998 | Sotomayor .............................. 707/501 |
| 5,754,938 | 5/1998 | Herz et al. ............................... 455/4.2 |
| 5,778,363 | 7/1998 | Light .......................................... 707/5 |
| 5,848,191 | 12/1998 | Chen et al. ............................ 382/229 |
| 5,873,056 | 2/1999 | Liddy et al. ................................ 704/9 |
| 5,918,236 | 6/1999 | Wical ...................................... 707/500 |
| 5,940,624 | 8/1999 | Kadashevich et al. ..................... 704/9 |

*Primary Examiner*—Joseph Thomas
*Attorney, Agent, or Firm*—Whitham, Curtis & Whitham; Stephen C. Kaufman, Esq.

[57] ABSTRACT

A method is disclosed for detecting topical changes and topic identification in texts in real time using likelihood ratio based methods. In accordance with the method, topic identification is achieved by evaluating text probabilities under each topic, and then selecting a new topic when one of those probabilities becomes significantly larger than the others. The method is usable to improve real time machine translation.

24 Claims, 8 Drawing Sheets

REAL TIME DETECTION OF TOPICAL CHANGES AND TOPIC IDENTIFICATION VIA LIKELIHOOD BASED METHODS

BACKGROUND OF THE INVENTION

1. Field of the Invention

The present invention generally relates to real time topic detection, and more particularly to the use of likelihood based methods for segmenting textual data and identifying segment topics.

2. Background Description

The problem of automatically dividing a text stream into topically homogeneous blocks in real time arises in many fields that include a topic detection task: command recognition, speech, machine translation, event detection, language modeling etc. In each of these fields there exist applications that require real time segmentation of text. For example, a close caption via automatic speech recognition would be improved significantly with a real time topic identification.

There exist some methods for dealing with the problem of text segmentation. In general, approaches fall into two classes: 1) content based methods, which look at topical information such as n-grams or IR similarity measures; and 2) structure or discourse-based methods, which attempt to find features that characterize story opening and closings.

Some of these methods are based on semantic word networks (see H. Kozina, "Text Segmentation Based on Similarity between Worlds", in Proceedings of the ACL, 1993), vector space technique from information retrieval (see M. A. Hearst, "Multi-paragraph Segmentation of Expository Texts", in Proceedings of the ACL, 1994. Proc Eurospeech '93, pp. 2203-2206, Berlin), and decision tree induction algorithm (see D. J. Litman and R. J. Passonneau "Combining Multiple Knowledge", in Proceedings of the ACL, 1995). Several approaches to segmentation are described in Jonathan P. Yamron, et al., "Event Tracking and text segmentatkion via hidden Markov models", in 1997 *IEEE Workshop on Automatic Speech Recognition and Understanding Proceedings*(IEEE, New York: 1997), pp. 519–26.

Several approaches to topic detection are described in DARPA, Broadcast News Translation and Understanding Workshop, Febr. 8–11, 1998. Some of them (e.g. Sadaki Furui, Koh'ochi Takagi, Atsushi Iwasaki, Katstoshi Ohtsuki and Shoichi Matsunaga, "Japanese Broadcast News Transcription and Topic Detection") require all words in an article to be presented in order to identify a topic of the article. A typical approach for topic identification is to use key words for a topic and count frequencies of key words to identify a topic.

These methods are not very successful in detection of the topical changes present in the data. For example, model-based segmentation and the metric-based segmentation rely on setting measurement thresholds which lack stability and robustness. Besides, model-based segmentation does not generalize to unseen textual features. Furthermore, the problem with using textual segmentation via hierarchical clustering is that it is often difficult to determine the number of clusters. All these methods lead to a relatively high segmentation error rate and are not effective for real time applications. Therefore new complementary segmentation methods are needed.

Concerning known topical identification methods, one of their deficiencies is that they are not suitable for real time tasks since they require all data to be presented. Another deficiency is reliance on several key words for topic detection. This makes real time topic detection difficult since key words are not necessarily present at the onset of the topic. Another problem with key words is that a different topic affects not only frequencies of key words but frequencies of other (non key) words. Exclusive use of key words does not allow one to measure contribution of other words in topic detection.

SUMMARY OF THE INVENTION

It is therefore an object of the present invention to provide an improved method for real time segmentation of textual data.

Another object of this invention is real time topic identification of textual data.

A further object of the invention is to provide a method for real time topic identification that is stable and robust.

An object of the invention is a method of segmentation having a low error rate suitable for real time applications.

Another object of this invention is an improved speech-to-machine real time translation based on real time segmentation of textual data.

The present invention implements a content-based approach that exploits the analogy to speech recognition, allowing segmentation to be treated as a Hidden Markov Model (HMM) process. More precisely, in this approach the following concepts are used: stories are interpreted as instances of hidden underlying topics; the text stream is modeled as a sequence of these topics, in the same way that an acoustic stream is modeled as a sequence of words or phonemes; topics are modeled as simple unigram distributions.

The foregoing objects of the invention are achieved in two steps: segmentation of textual data into "homogenous" segments, and topic (event) identification of a current segment. First, however, a battery of topics is formed from training data. Threshold ratios are established for determining change of topics in the text and for identifying a topic in a current text word string, using this training data or theoretical estimates. A neutral topic is established in order to restart the process when topics cannot be identified.

Changes in topic are detected by successively looking backward from a current word, one additional word word at a time, to a prior word, determining for each step in succession whether a comparative topic change metric is greater than a topic change threshold ratio. The metric includes some likelihood measure that a word string extending from the current word to the prior word will be found in a context of a topic in the battery, not including the neutral topic. If the metric exceeds the topic change threshold, the prior word in the current text word string is declared an onset point of a new topic, different from the current topic. If the metric does not exceed the topic change threshold, then the prior word is moved back one word and the topic change detection process is repeated. If the metric is less than a value of one for all intervening determinations, then the current word is-declared a new regeneration point. The topic change detection process is repeated again until a change in topic is detected or until the prior word is moved back to the regeneration point.

When a word string is determined to contain a new topic, topic identification proceeds in two steps. First, it is verified whether the topic associated with the word string is in the battery. If it is not in the battery, then the neutral topic is made the current topic. Otherwise, it is then determined whether a comparative topic identification metric is greater than a topic identification threshold ratio for any topic in the battery, other than the current topic. If so, then that topic is declared to be the new topic. If not, then a word is added to the word string and the topic identification process is repeated.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
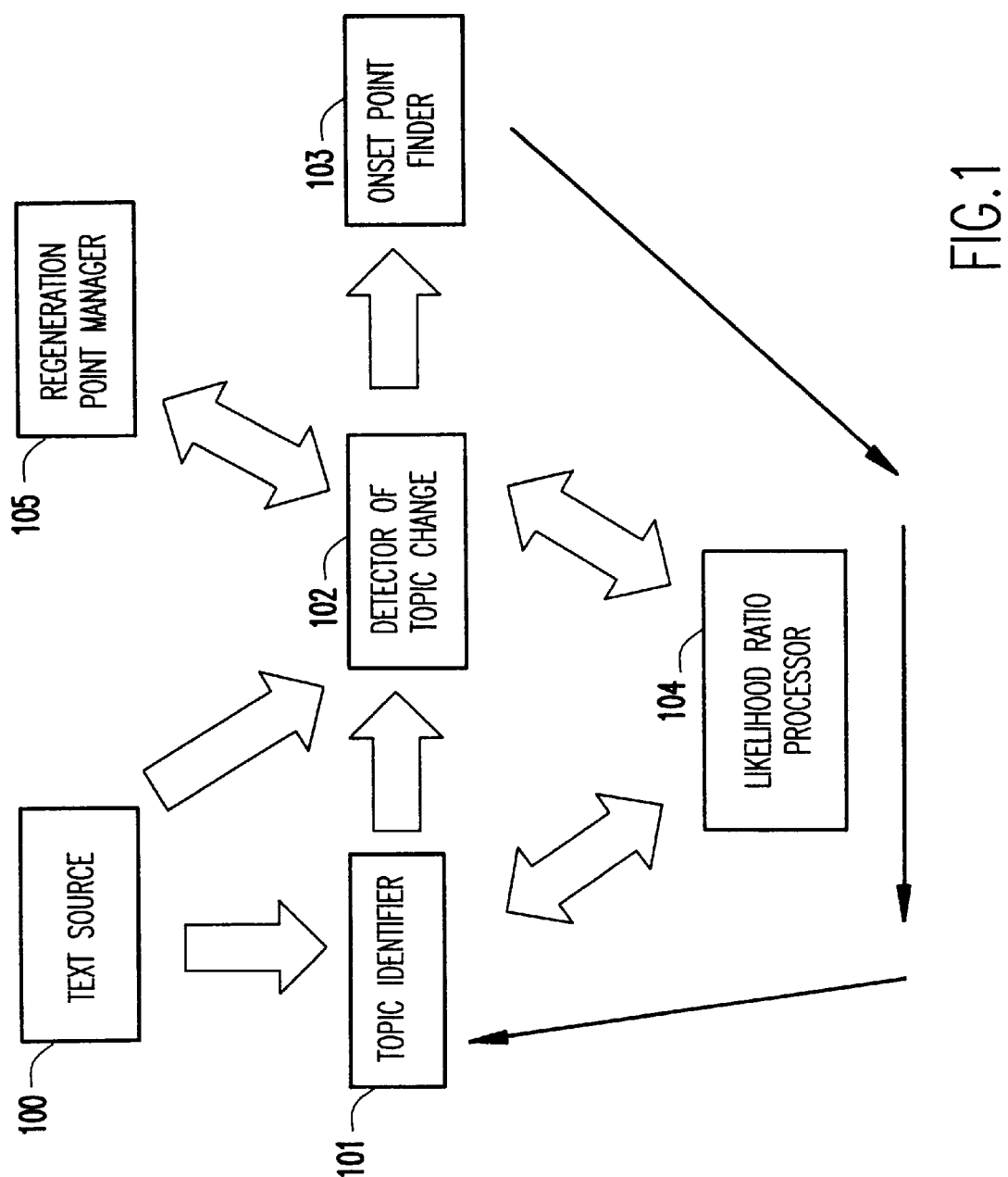
FIG. 1 is a flow chart of a general for change-point and topic process

The basic approach of the invention is to apply change-point detection methods for detection of "homogenous" segments of textual data. This enables identification of "hidden" regularities of textual components, creation of mathematical models for each homogenous segment, identification of topics, and tracking of events, such as topic changes. After onset of a new topic is identified via a change-point detection method, a new topic is identified for the current segment. The topic identification method relies upon a battery of topics formed from existing text data, and uses estimates of probabilities for the current segment with respect to distributions of words from text for each topic probability model in the battery, and compares estimated scores. A method is included to establish whether a new topic is or is not in the battery, and if not then (a) a switch to the "neutral" topic $\tilde{T}$ is made and (b) a record is preserved that enables subsequent analysis of the data. Such analysis can lead to a decision to add a new topic to the battery.

In general a change-point strategy can be implemented using a variety of statistical methods. In the present invention a change-point method is realized using likelihood ratio techniques. For a general description of likelihood methods one can refer to Douglas M. Hawkins and David H. Olwell, "Cumulative Sum Charts and Charting for Quality Improvement", in *Statistics for Engineering and Physical Science*, 1998; Yashchin, Emmanuel, "Weighted Cumulative Sum Technique", *Technometrics*, 1989, Vol. 31, 321–338; Yashchin, Emmanuel, "Statistical Control Schemes: Methods, Applications, and Generalizations", *International Statistical Review*, 1992, Vol. 61, No. 1, pp. 41–66).

Application of these methods to detection of topical changes in accordance with the invention can be described briefly as follows:

Step 1. (Training procedure)

Create a battery of topics $T_1, T_2, \ldots, T_n$. Every topic is characterized by frequencies of tokens, frequencies of combinations of two words, three words etc. We assume that the Kullback-Liebler distance between any two topics is at least h where h is some sufficiently large threshold.

Establish a "neutral" topic $\tilde{T}$ that is derived from textual data that include all topics and other general texts (e.g. from an encyclopedia). $\tilde{T}$ will be handy when we fail to establish topics because of their short life and as a result end up with mixture of topics. $\tilde{T}$ provides us with an instrument to re-start the process.

Find typical durations of texts belonging to topics in the battery (for possible applications tasks, e.g. broadcasting news or lectures). This information can be used later in order to set limits in topic identification methods as will be described below.

Step 2 (Begin process)

Look at estimated frequencies and compare them to all topics in the list. As soon as a single topic emerges as a strong winner, declare this topic. If a conclusion is reached that a current topic is not in the list, declare $\tilde{T}$ as the current topic. The topic should not be established too early (to avoid topic misidentification because of insufficient data). In some practical applications efforts should be made to identify a topic long before its end. For example, in real time machine translation we need correct topic information to improve translation and therefore a topic identification is needed before end of the topic to be useful.

Step 3. (Monitoring)

Once a topic T has been declared, begin a monitoring process to detect a change. In this process compare likelihood of text against T (by looking backward) until a regeneration point is reached or until a signal is triggered. A regeneration point is defined as a "stopping" point beyond which there is no need to continue backward tests. An efficient procedure for defining a "stopping" point via definition of a regeneration point is implemented in this invention (following a general concept that is described in Yashchin, Emmanuel, "Likelihood Ratio Methods for Monitoring Parameters of a Nested Random Effect Model", *Journal of the American Statistical Association*, June 1995, Vol. 90, No. 430, Theory and Methods, pp. 729–737.)

Step 4. (Establish a current topic)

Once the change is detected, establish the time of onset of the new topic, but do not declare the new topic yet. Continue accumulating words until a clear winner emerges. This procedure consists of the following steps:

Find a candidate topic $T_i$ for which the likelihood of the text is maximal.

Find the closest competing topic, i.e. a topic that has the maximum of likelihoods corresponding to remaining topics excluding $\tilde{T}$.

Compare a likelihood of the group of words in the candidate topic $T_i$ against $\{T_1, \ldots\}$. If this likelihood is higher, by a given factor, than likelihood of a text to the closest competing topic—then declare $T_i$ as the current topic.

If a conclusion is reached that a topic is not in the list, declare $\tilde{T}$ the current topic.

Step 5. (Restart monitoring current topic)

After a new topic has been declared restart the monitoring procedure to detect a change (i.e. return to step 3).

Before introducing a monitoring procedure we need some notations. Let $P(w_l, w_{l+1}, \ldots w_r|, T_i)$ represent some likelihood measure for "seeing" a given string of words $w_l$, $w_{l+1}, \ldots w_r$ in a context of a topic $T_i$ from the battery. Let $$f_i(w_l, w_{l+1}, \ldots w_r) = \max_{j=1 \ldots n, \ T_j \neq T_i; T_j = \tilde{T}} P(w_l \ldots w_r | T_j) \quad (1)$$

Suppose that moment of time 1 corresponds to a regeneration point and that we already analyzed words from $w_l$ to $w_m$ and found no evidence that the declared topic $T_i$ changed. Now we want to check whether the next word $w_{m+1}$ belongs to the same topic or that the topic has changed.

The procedure for this verification involves the following steps.

Take a segment of length 1. Is $$\frac{F_i(w_{m+1})}{P(w_{m+1} | T_i)} > c?$$

If YES then declare that topic is not $T_i$. And also declare $m+1$ as the onset point of a new topic.

If NOT take segment of length 2. Is $$\frac{F_i(w_m, w_{m+1})}{P(w_m, w_{m+1} | T_i)} > c?$$

If YES then declare that topic is not $T_i$. And also declare $m$ as the onset point of a new topic.

If NOT take segment of length 3. Is $$\frac{F_i(w_{m-1}, w_m, w_{m+1})}{P(w_{m-1}, w_m, w_{m+1} | T_i)} > c?$$

$$\vdots$$

Continuing in this fashion, did you find a segment (going back in time until the regeneration point) for which $$\frac{F_i(w_{m+2-k} \ldots w_{m-1}, w_m, w_{m+1})}{P(w_{m+2-k} \ldots w_{m-1}, w_m, w_{m+1} | T_i)} > c? \quad (2)$$

If YES then declare that topic is not $T_i$. And also declare $m-k+2$ as the onset point of a new topic. If NOT then declare that there is no evidence in change of topic.

If we reached 1 and for all the previous steps, including a regeneration point $$\frac{F_i(w_{m+2-k} \ldots w_{m-1}, w_m, w_{m+1})}{P(w_{m+2-k} \ldots w_{m-1}, w_m, w_{m+1} | T_i)} < 1 \quad (3)$$

then declare $w_{m+1}$ a new regeneration point.

A threshold value c in the above formulae depends on a chosen trade-off between rate of false alarms and sensitivity. This threshold value can be estimated theoretically or from trial experiments. It can also be influenced by the expected duration of topics, as noted in "Step 1 (Training procedure)", above.

Using link grammars methods (see J. Lafferty, D. Sleator, D. Temperley, "Grammar Trigrams: A Probabilistic Model of Link Grammar", presented to the 1992 AAAI Fall Symposium on Probabalistic Approaches to Natural Language) one can provide examples when a current word detects a link with a word that is located 'remotely', i.e. far away from the current word position. This can also be used to measure contribution of 'remote' words in likelihood ratios.

An explicit representation of an expression $P(w_{m+2-k} \ldots w_{m-1}, w_m, w_{m+1}|T_i)$ depends on chosen parametrical models for probability distributions or estimation of probabilities from training data. If these probabilities can be split into multiplicative factors (depending on composition of textual data into component words or phrases) then a simplified expression for ratio of probabilities can be obtained. If there is a very large number of topics one can use parallel processing to compute maximum score in Equation (1). One can also use the following version of the monitoring procedure that does not require computation of maximum scores at each step.

Variant

In the notations of the previous sections: Let a topic $T_j$ be declared and its onset time found. Take a new word. Then set $k=1$ and, starting from a current word $w_{m+1}$, go k words back and find probabilities $P^{(T_j)}{}_{m+1-i} = p(w_{m+1-i}|T_j)$, $i=0, 1, \ldots$, $k-1$. Also construct the distribution $\{\hat{p}_{m-k+2}, \ldots \hat{p}_{m+1}\}$ where $$\hat{p}_i = \frac{\text{number of times word } i \text{ appeared in the current segment of size } k}{k}.$$

Now construct the sum:

$$S_k = \sum_{i=0}^{k-1} \ln \frac{\hat{p}_{m-i+1}}{p^{(T_j)}_{m-i+1}} \quad (4)$$

If $S_k > c$ declare that a change in topic occurred and declare $m-k+2$ the onset point. If not, increase k by 1 and repeat the process. If we reached the regeneration point and never find $S_k > c$ then continue with the topic $T_j$. If for the present point $S_k < 0$ for every k, then declare the present point a new regeneration point.

Note that if parameter c is chosen too high then we risk detecting a topic change too late. If c is chosen too low then we increase the risk of making a false statement that a change in topic has occurred.

Variant of Step 3

Perform Step 3 as described above, but instead of increasing the depth of backward analysis one word at a time, increase it $\Delta$ words at a time. In other words, instead of increased k by 1, increase k by $\Delta$. The last segment analyzed must always correspond to the last regeneration point. When $\Delta = \infty$, this leads to a procedure in which only one segment, covering words from the last regeneration point upto the current word m+1, is inspected. For more details on this procedure see Emmanuel Yashchin "Change Point Models in Industrial Applications," in *Nonlinear Analysis*, 1997, Vol. 30, No. 7, pp. 3997–4006.

Topic identification

The topic identification of a given text segment $w_l, \ldots, w_{m+1}$ consists of two steps. The first step is a verification whether this segment is covered by a new topic that is not in the battery of topics. If it was found that the segment is covered by some topic from the battery, then this topic is identified in the second step.

In what follows a mathematical description of this procedure is given for two different implementations.

Phase 1: Test if topic is in the battery.

For a given k corresponding to the segment associated with the current topic, compute for every j in the battery $$S_{(j)} = \sum_{i=0}^{k-1} \ln \frac{\hat{p}_{m-i+1}}{p_{m-i+1}^{(T_j)}} \quad (5)$$

If $S_{(j)} > c$ for all j, declare that the topic is not in the battery and switch to the neutral topic $\tilde{T}$.

Data from new topics can be collected and stored for later off-line processing to include new topics into the battery.

Phase 2: Establish the topic.

a) Economical implementation.

If $$\frac{P(w_{m-k+2} \ldots w_{m+1} | T_i)}{\max_{j \neq i} P(w_{m-k+2} \ldots w_{m+1} | T_j)} > c_1 \quad (6)$$

for some i then declare $T_i$ as a new topic.

b) Robust implementation.

Though we declared m−k+2 the onset point of the new regime, we still are checking intermediate segments. If $$\frac{P(w_l \ldots w_{m+1} | T_i)}{\max_{j \neq i} P(w_l \ldots w_{m+1} | T_j)} > c_1 \quad (7)$$

for some i and l=m+1, m, . . . , m−k+2 then declare $T_i$ as a new topic.

If we neither established that the topic is not in the battery nor identified the topic, take an additional point (increase m by 1) and return to Phase 1.

Before a topic identification procedure on new texts is started some topical data should be collected from texts with known topics. This training procedure is described below with reference to FIG. 7.

Turning now to FIG. 1, topic identification process 101 starts with the segment of length 1 at the first word in the text 100. This text segment is growing, taking new words from the text source 100 until the topic is identified via a likelihood ratio processor 104 (as explained with reference to FIG. 8, below).

After the topic is identified, the module 102— detector of topic change—is activated. The topic change is also detected using likelihood ratio scores (using different settings in comparison with a topic identification mode). This module is explained below with reference to FIG. 6. When a topic change is detected, onset of a new topic (103) is also identified (as explained with reference to FIG. 6). If topic change for the current segment is not detected, the textual segment is growing (from 100) and the process of detecting change point 103 is repeated. The process of detecting a change point uses some computations of likelihood ratios over data that requires going backward in the text segment until a regeneration point is reached. The regeneration point coincides with the beginning of the text segment unless another regeneration point is found when certain conditions on likelihood ratios in 105 are met (as explained with reference to FIG. 6). When sufficient evidence of a topic change is obtained in 102, an onset point of a new topic is computed in 103 using different likelihood ratio criteria in 104 (as explained below with reference to FIG. 8). After that the text segment in 100 grows until either a clear topic winner emerges or it is found that a new topic is not in the battery and a neutral topic is declared in the segment 102 (until the onset point of a new topic).

Likelihood processor 104 (FIG. 1) uses probability models for given topics. A model for a given topic is specified, based on data, at the time when this topic is included in the battery. The important class of probability models is considered in FIG. 2, to which we now turn. In this figure topic probabilities 201 of the segment 202 are represented via the following multiplicative distributions 203:

$$P(w_{m+2-k}, w_2 \ldots w_{m+1} | T_i) = \prod_{t=0}^{k-1} P(w_{m+1-t} | T_i) \quad (8)$$

where $P(w_j | T_i)$ denote a frequency of j-th word estimated from a textual corpus that belongs to a topic $T_i$.

After taking a logarithm from Equation (8) we get the following sum:

$$\ln P(w_{m+2-k}, w_2 \ldots w_{m+1} | T_i) = \prod_{t=0}^{k-1} \ln P(w_{m+1-t} | T_i) \quad (9)$$

Taking the logarithm from the product defined by Equation (8) in 204 allows us to represent the likelihood ratio as a sum of scores, as described above with reference to Equation (4). Representation of likelihood ratios as sums of logarithms makes computations more efficient (since vector processors can be used) and allows use of threshold values that are easier to estimate.

The further steps of the algorithm (205) are similar to steps that are described in FIG. 1.

Figure 2:
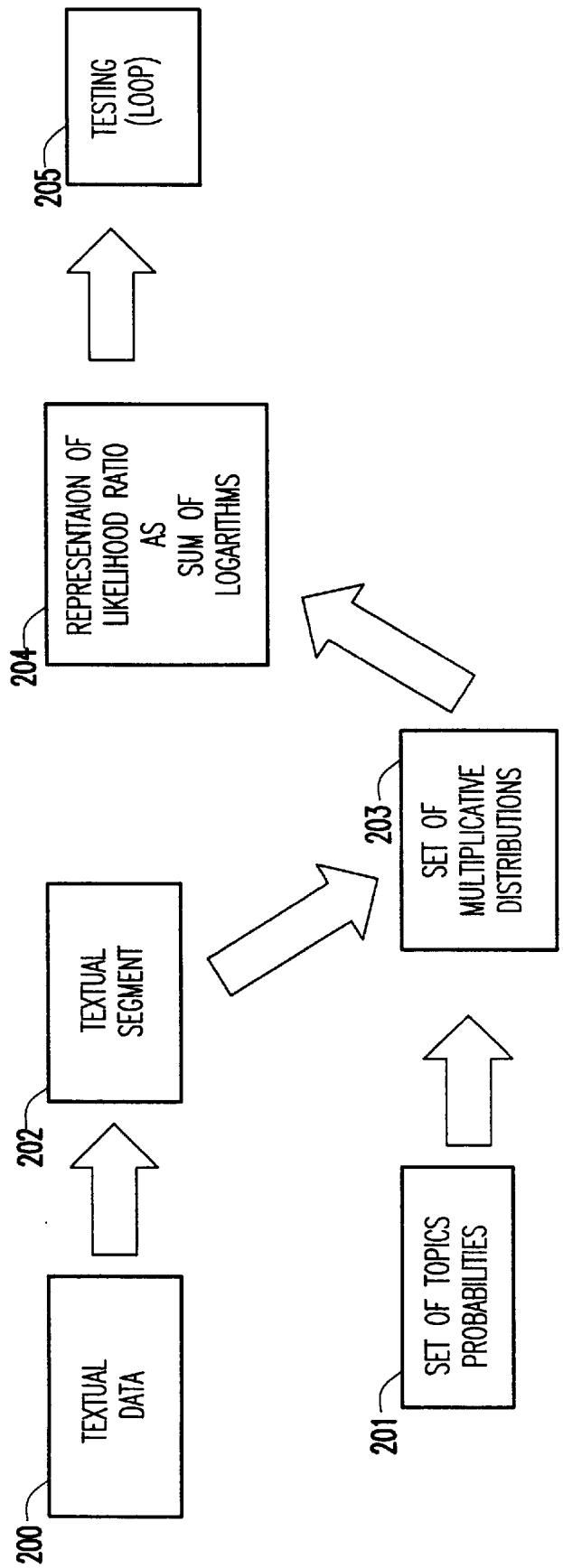
FIG. 2 is a flow chart of a process for change-point detection via CUSUM methods in which textual data is modeled by multiplicative distributions.
Figure 3:
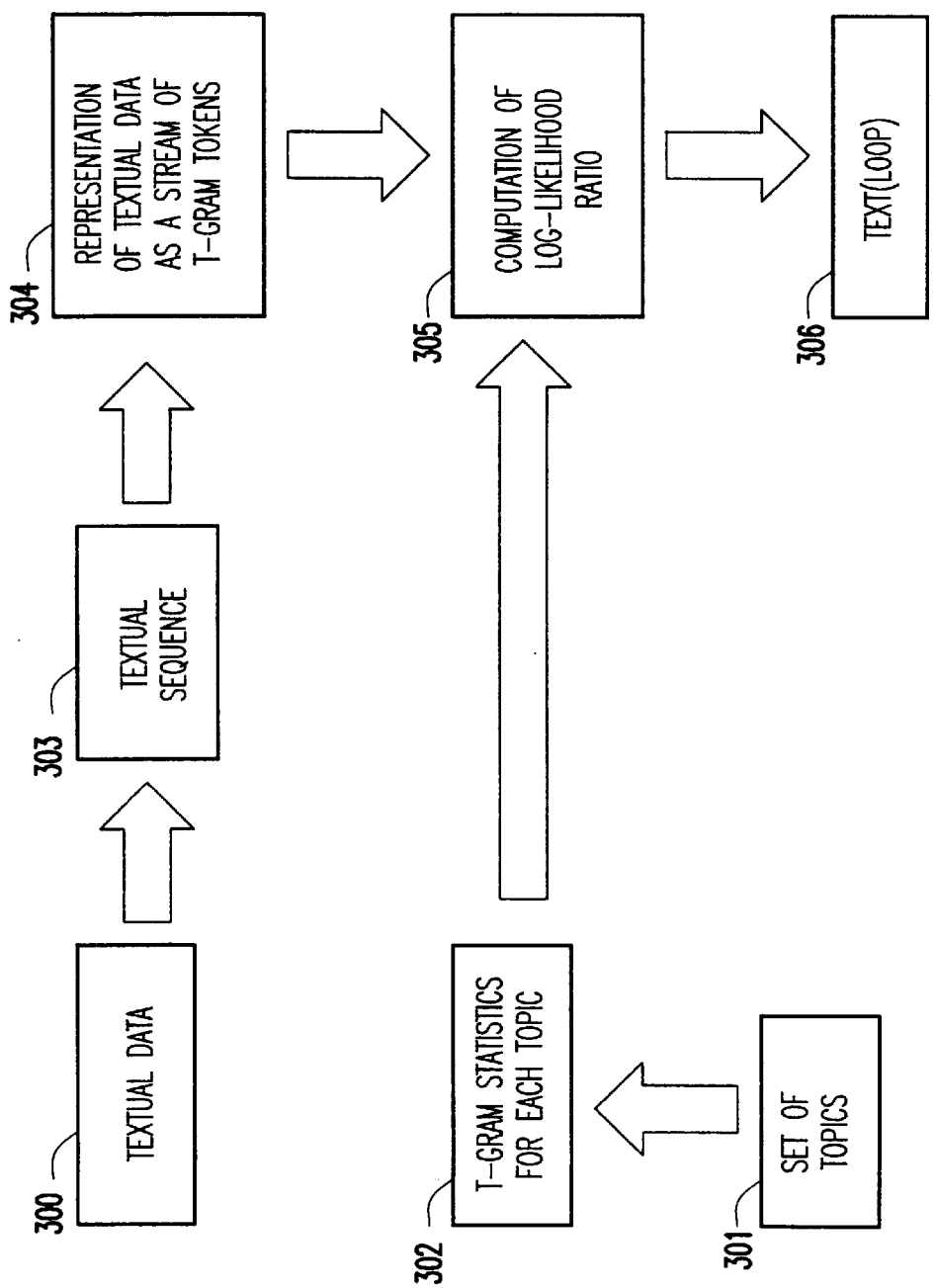
FIG. 3 is a flow chart of another process for change-point detection via CUSUM methods based on estimate of n-gram word frequencies.

We now turn to FIG. 3, which is similar to the FIG. 2. The difference lies in different methods of computing likelihood scores of observed strings of words in target textual data given topics in the battery.

A segment of size k (303) is extracted from textual data 300 whose topic is to be identified via likelihood analysis. In block 304 a string of words $W_1^{N+1} = w_1, w_2, \ldots, w_N, w_{N+1}$ is represented as a string of t-gram tokens $W_1, W_2, \ldots, W_N$, $W_{N+1}$, where $W_i = w_{i-T+1}, \ldots w_i$. In the module 302 for each such sequence of words $W_i$ a t-gram probability score $P_{W_i}^T = \text{Prob}_t(w_i | w_{i-1}, \ldots, w_{i-T+1})$, which is the probability of seeing the word $w_i$ given a sequence $w_{i-1}, \ldots, w_{i-t+1}$, is estimated for each topic T in the battery from 301.

A likelihood of observing a whole string of words $W_1^{N+1}$ is computed as a product of t-gram probability scores $\Pi_{i=1}^{N+1} P_{W_i}^T$. As explained above with reference to FIG. 2, one can take a logarithm from this product and reduce a log liklihood score to a sum of terms $\log(P_{W_1}^T)$. The log-likelihood ratio 305 is computed as a difference of a sum of logarithms.

One can also use a mixture of t-gram probability scores for different t while computing a likelihood score given a string of words.

Figure 4:
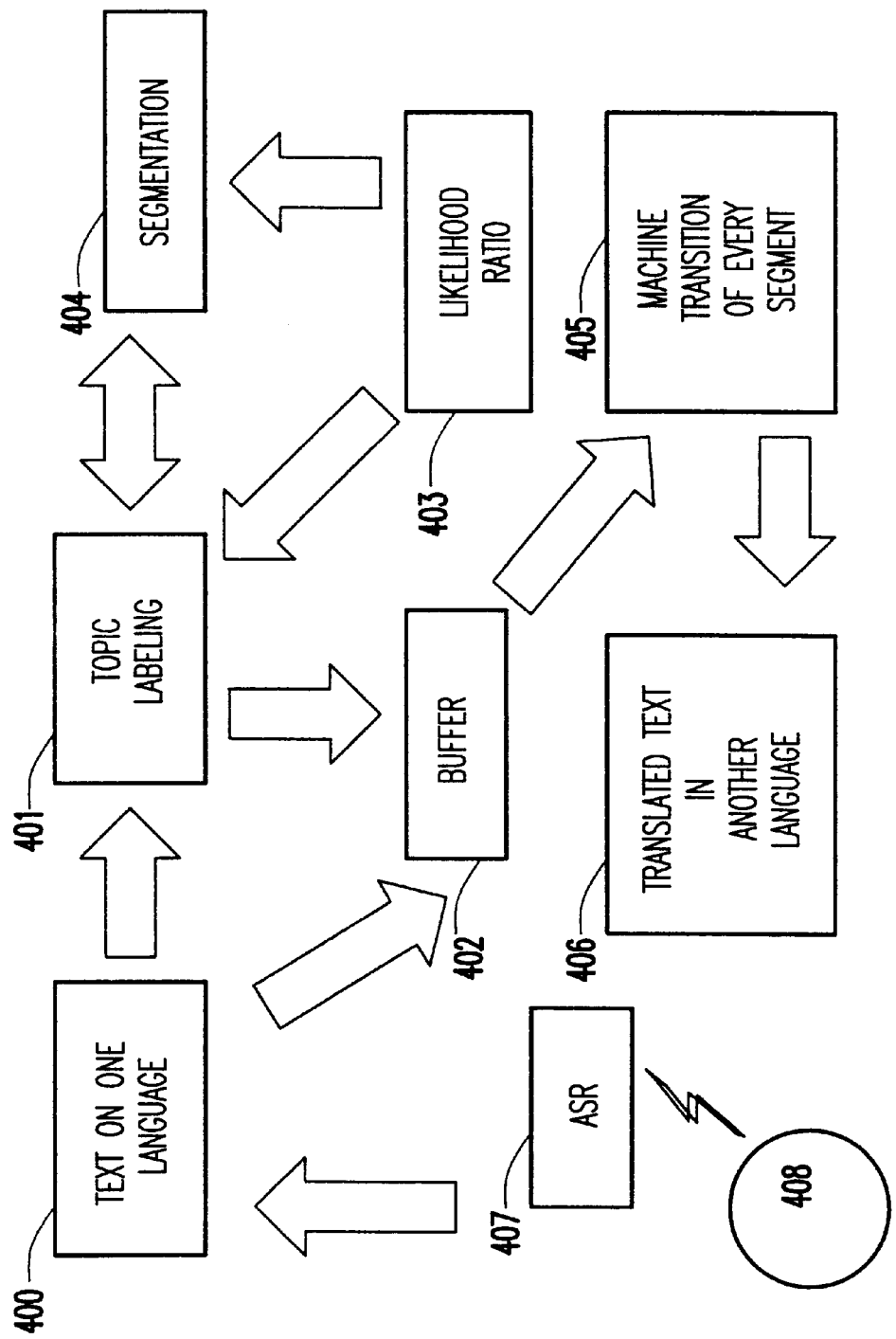
FIG. 4 is a flow chart of a process for improving a real time speech-to-machine translation with a segmentation method.

Referring now to FIG. 4, an important application of real time detection of topic changes and topic identification is a translation of spoken speech into different languages that is done via combination of an automatic speech recognition device (ASR 407) and machine translation. In such an application one can assume that the ASR 407 (that sends a decoding output 400 into a translation machine 405) has a negligible error rate and therefore decoding errors do not influence topic identification. In what follows it is assumed that a decoding text 400 is close to a correct text (that was spoken).

A block 400 contains a text that should be translated. This text is segmented (404) with topic onsets and labeled with topics in a block 401 using likelihood ratios 403 as in explanations in FIG. 1 While text data is accumulated to proceed with topic identification of a segment it is stored in the buffer 402. After a topic of the current segment was established a text segment from a buffer is sent to 405 for translation. A machine 405 performs translation on each homogenous segment using different language models that were trained for each topic. An output of the machine 405 is a translated text 406.

Figure 5:
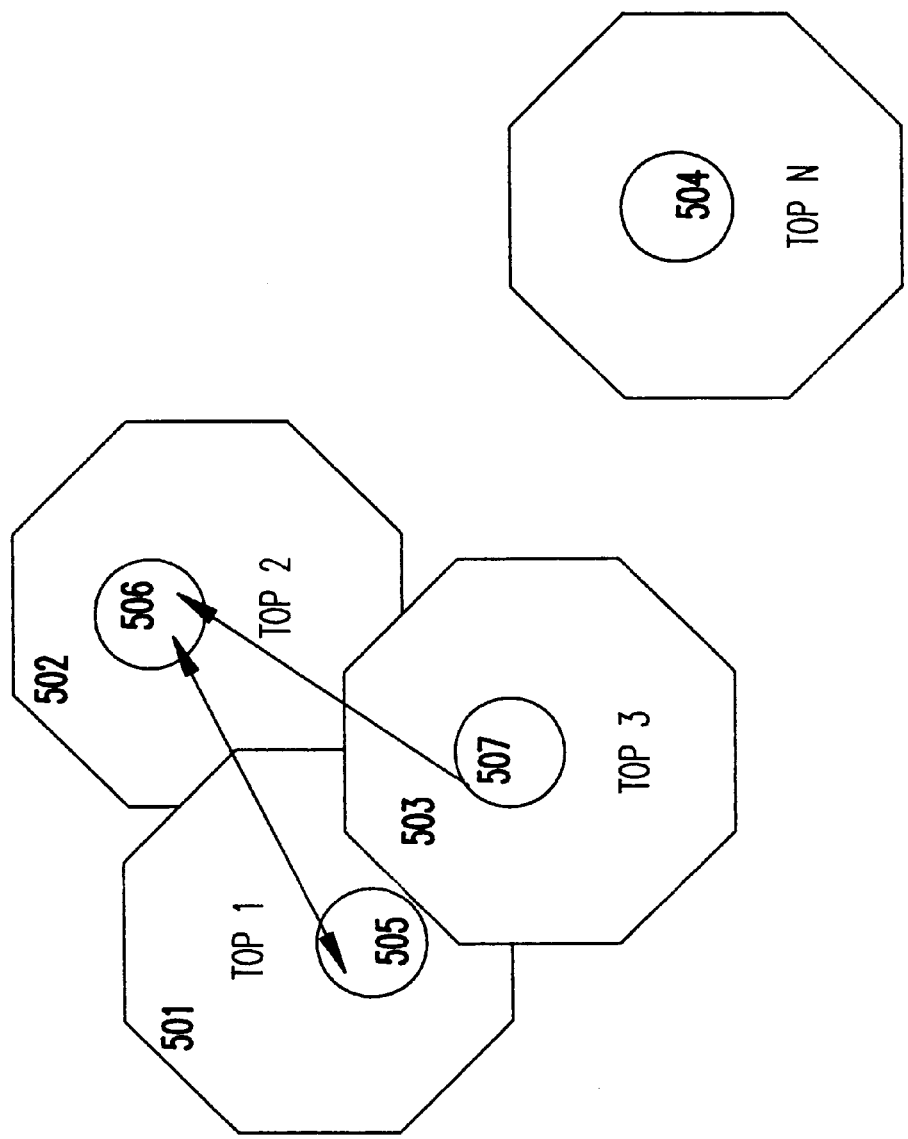
FIG. 5 illustrates separation of features belonging to different topics and topic identification via a Kullback-Liebler distance.

Referring now to FIG. 5 there is shown how texts that are labeled with different topics are denoted as 501 (topic 1), 502 (topic 2), 503 (topic 3), 504 (topic n) etc. Textual features can be represented as frequencies of words, combination of two words, combination of three words etc. On these features one can define metrics that allow to compute distance between different features. For example, if topics $T_i$ give rise to probabilities $P(w_t|T_i)$, where $w_t$ run through all words in some vocabulary, then a distance between two topics $T_i$ and $T_j$ can be computed as $$I(T_i, T_j) = \sum_{w_t} P(w_i | T_i) \ln \frac{P(w_i | T_i)}{P(w_i | T_j)} \qquad (10)$$

Using Kullback-Liebler distances is consistent with likelihood ratio criteria that are considered in the present invention (e.g. threshold $c_1$ used in Equation (6), above). Similar metrics could be introduced on tokens that consist of t-gram words or combination of tokens. Other features reflecting topics (e.g. key words) can also be used. For every subset of k features one can define a k dimensional vector. Then for two different k sets one can define a Kullback-Liebler distance using frequencies of these k sets. Using Kullback-Liebler distance one can check which pairs of topics are sufficiently separated between themselves. Topics that are close in this metric could be combined together. For example, one can find that topics related to LOAN and BANKS are close in this metric and therefore should be combined under a new label (e.g. FINANCE). Also using these metrics one can identify in each topic domain textual feature vectors ("balls") that are sufficiently separated from other "balls" in topic domains. These balls are shown on FIG. 5 as 505, 506, 504 etc. When such "balls" are identified, likelihood ratios as shown in FIG. 1 are computed for tokens from these "balls". For example, one may find out that singular words do not separate topics sufficiently but that topics are separated well if features in "balls" consist of tokens of 3 word tuples. In this case likelihood ratios are computed as explained above in reference to FIG. 3 for 3-gram tokens.

Figure 6:
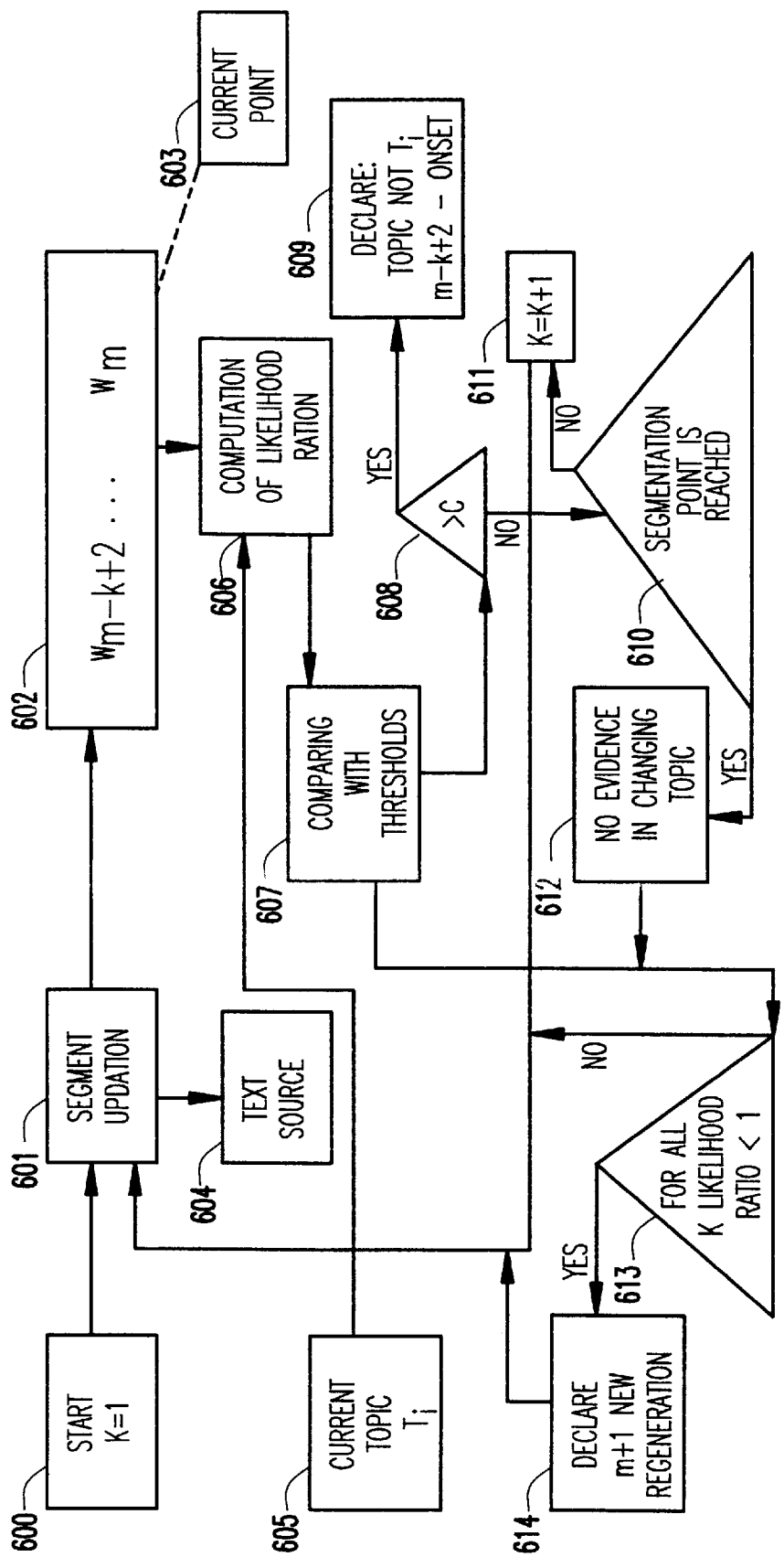
FIG. 6 is a flow chart of a process for detection of a topic change.

Refering now to FIG. 6, we see that once a current topic has been declared a monitoring procedure for detection of topic change is started with a current point (603) that corresponds to a segment 602 of the size 1 (k=1 in a starting module 600). The procedure for verification of topic change is similar for all segment sizes and is demonstrated in FIG. 6 with a segment 602 of the size k. The likelihood ratio corresponding to a segment in 602 is computed in 606 using Equations (2) or (4). In module 607 the likelihood ratio from 606 is compared to a threshold. If this threshold is exceeded 608 then one declares in 609 that there is an evidence of topic change and the point m−k+2 is declared an onset of a new topic. The exact new topic will be defined in the next step (as described with reference to FIG. 8). If the threshold is not exceeded, then it is verified (610) whether the regeneration point has been reached (i.e. whether it makes sense to go backward beyond the point $w_{m−k+2}$ in the segment 602). If the regeneration point has been reached then it is declared in 612 that there is no evidence indicating topic change. After that it is verified in 613 whether the regeneration point conditions (Equation 3) are fulfilled for all subsegments $w_{m-k+2} \ldots w_{m+1}$, where k is running from 1 to the its latest value when 612 was activated and corresponds to previous regeneration. If it is found that these conditions (Equation 3) are fulfilled for all subsegments, a new regeneration point $w_{m+1}$ is declared 614. If it is found in 610 that the regeneration point has not yet been reached then a value of k is increased by 1 and the segment is increased in size by 1 word in 601 by going backward in the text 604. Then the process is continued through 602 as described above until either a change in topic is declared or it is found that the topic is not in the battery.

Figure 7:
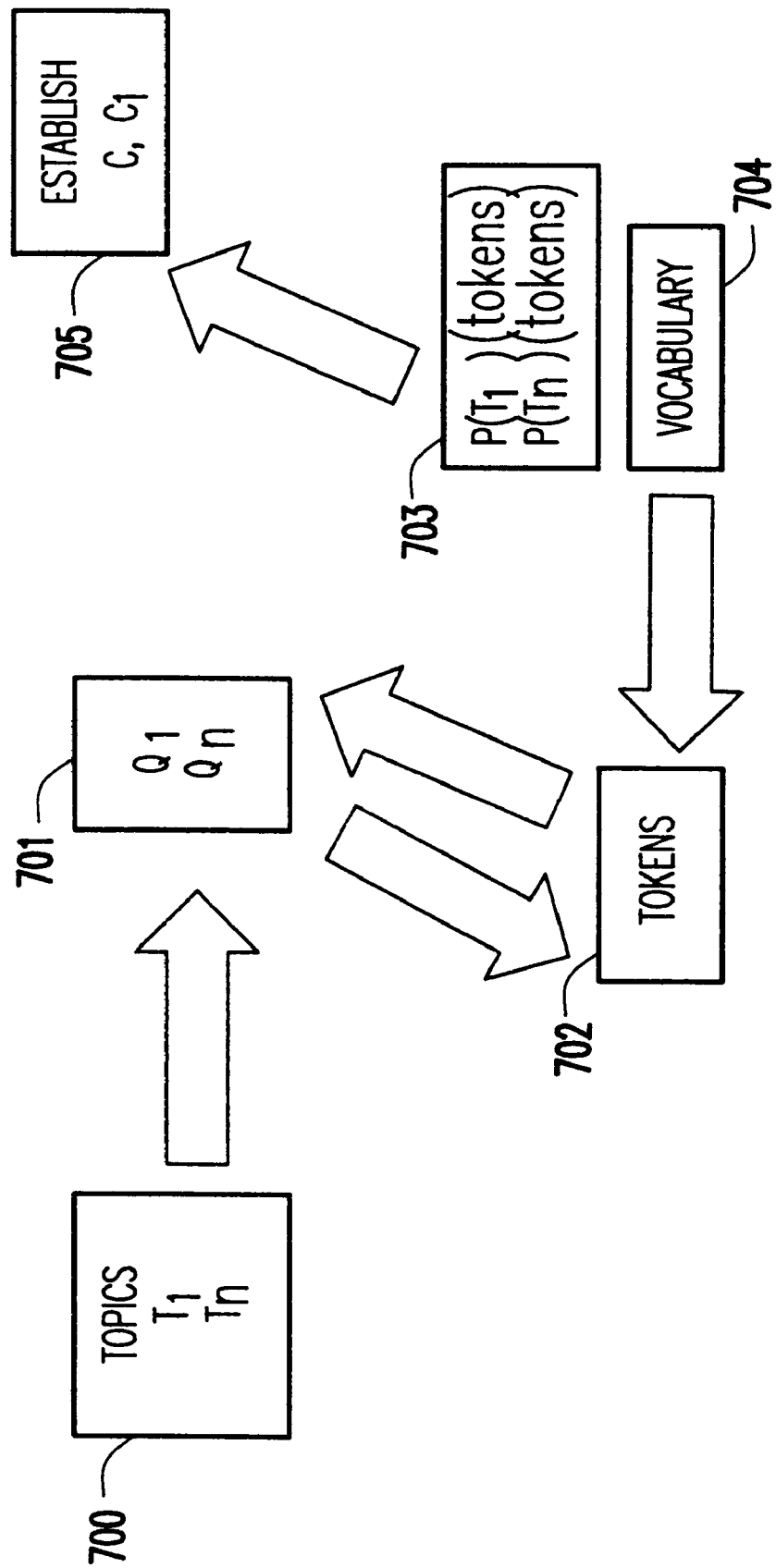
FIG. 7 is a flow chart for a training procedure.

Refering now to FIG. 7, there is shown a training stage for a battery of topics in accordance with the invention. This training stage is done in advance, before topic identification procedures. A battery 700 contains n topics $T_1, \ldots, T_n$. Each topic $T_i$ is represented by a training text $\Omega_i$ in 701. In (702) tokens from a vocabulary (704) are formed (tokens could consist of single words, 2 word tuples or n word tuples). For each training text $\Omega_j$ probability distributions $P_i^{(T_j)}$ of tokens from 702 are estimated. These probability distributions can be obtained as frequencies of tokens in corresponding texts in 701. In the module 703 thresholds $c, c_1$ (see the discussion in connection with Equations (2), (6) and (7)) are defined from training data.

Figure 8:
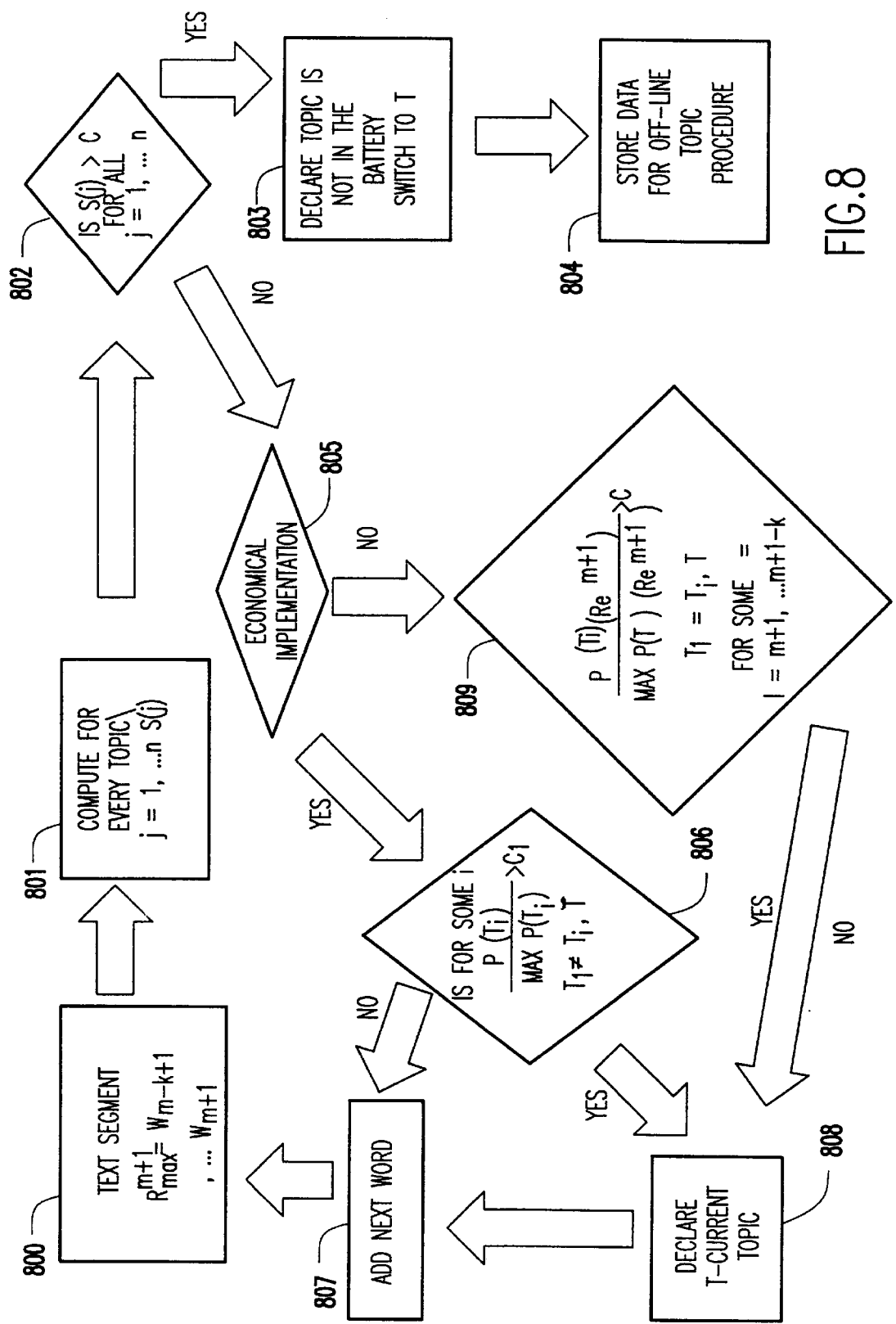
FIG. 8 is a flow chart of a process for identification of a topic.

Topic identification is now described with reference to FIG. 8. Topic identification is performed for a segment $R_{m-k+2}^{m+1} = (w_{m-k+2}, \ldots, w_{m+1})$ that was produced either when a topic change was declared as described above with reference to FIG. 6 or from a preceding step of topic identification. Scores $S^{(j)}$ of this text segment for each topic $T_i$ are computed in 801 in accordance with Equation (5). These scores (for each topic) are compared with c for all j in 802. If these scores exceed c for all topics then declare that a current topic is not in the battery (803) and switch to a "neutral" topic $\tilde{T}$ in the further monitoring process (and in a translation process that is described above with reference to FIG. 4). Otherwise, find a topic $T_i$ that maximizes a likelihood of seeing the sample for a given topic. If the inequality of Equation (6) in 806 (economical regime) or of Equation (7) in 809 (robust regime) are fulfilled, declare $T_i$ the current topic (808). Otherwise, add a new word (807) to the segment 800 and continue the process of topic identification.

In some applications there can be other criteria for choosing a topic. One can provide examples in which a next topic is uniquely defined either by a preceding topic or by a special word. For example, command phrases can be initialized with easily detectable words such as MOVE (this file), ERASE (a sentence that starts with a name Jonathan . . . ). But it is still necessary to define when a command phrase is finished (for purposes of command recognition).

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A method for real time identification of topics in text, comprising the steps of:
   forming a battery of topics from training data;
   detecting topic changes in said text, using said battery and a first threshold ratio;
   identifying topics in said text, using said battery and a second threshold ratio;

wherein said detecting and identifying steps are applied to said text in real time, wherein said first and second threshold ratios compare a metric having a likelihood measure, and wherein a topic can be identified for a current segment of said text prior to detecting a topic change in said segment.

2. The method of claim 1, wherein said first and second threshold ratios are determined from said training data.

3. The method of claim 1, wherein said first and second threshold ratios are estimated theoretically.

4. The method of claim 1 wherein said identifying step performs translation of segmented text using topic labeling of each segment.

5. The method of claim 1, wherein said detecting step further comprises the steps of:
  successively looking backward from a current word to a prior word, beginning where said prior word is said current word, determining for each step in said succession whether a comparative topic metric is greater than said first threshold ratio, said metric including some likelihood measure that a word string from said current word to said prior word will be found in a context of a topic in said battery, not including a neutral topic;
  if said determination is YES, declaring said prior word an onset point of a new topic different from a current topic;
  if said determination is NO, moving said prior word back one word and repeating said succession until said prior word is a regeneration point;
  if all said successive determinations are less than one, declaring said current word a new regeneration point, otherwise advancing said current word by one word and repeating said successive determinations.

6. The method of claim 5, wherein said likelihood measure for said word string is calculated for the most likely and next most likely topics of said battery, and said comparative topic metric is the ratio of said next most likely measure to said most likely measure.

7. The method of claim 5, wherein said comparative topic metric is $$S_k = \sum_{i=0}^{k-1} \ln \frac{\hat{p}_{m-i+1}}{p_{m-i+1}^{(T_j)}}$$

where $T_j$ is said current topic in said battery, where k is the length of said word string, where said current word is m+1 (at i=0), where said prior word is m-k+2 (at i=k-1), where $P^{T_j}_{m-i+1}$ is said likelihood measure for the single word located i words prior to said current word, and where $$\hat{p}_{m-i+1} = \frac{\text{number of times said single word appeared in said word string}}{\text{number of words in said word string}}.$$

8. The method of claim 5, wherein said identification step further comprises the steps of:
  verifying whether said new topic associated with said word string beginning with said onset point is in said battery;
  if said new topic is not in said battery, switching to said neutral topic;
  otherwise, determining whether a second comparative topic metric is greater than said second threshold ratio for a topic in said battery other than said current topic;
  if said determination is YES, declaring said topic to be the new topic;
  if said determination is NO, adding a word to said word string and repeating said identification step.

9. The method of claim 8, wherein said verifying step further comprises the steps of:
  computing for said word string and for every topic in said battery $$S_{(j)} = \sum_{i=0}^{k-1} \ln \frac{\hat{p}_{m-i+1}}{p_{m-i+1}^{(T_j)}}$$

where $T_j$ is the j-th topic in said battery, where k is the number of words in said word string, where said current word is m+1 (at i=0), where said prior word is m-k+2 (at i=k-1), where $P^{T_j}_{m-i+1}$ is said likelihood measure for the single word located i words prior to said current word, and where $$\hat{p}_{m-i+1} = \frac{\text{number of times said single word appeared in said word string}}{\text{number of words in said word string}}.$$

determining whether $S_{(j)}$ is greater than said first threshold ratio for every topic j in said battery.

10. The method of claim 8, wherein said identification determining step further comprises the steps of
  computing for said word string $$R_i = \frac{P(w_l \ldots w_{m+1} | T_i)}{\max_{j \neq i} P(w_l \ldots w_{m+1} | T_j)}$$

where l=m+1, m, . . . , m-k+2;
determining whether for some topic $T_i$ in said battery, other than said current topic, $R_i$ is greater than said second threshold ratio.

11. The method of claim 8, wherein said second comparative topic metric is $$R_i = \frac{P(w_{m-k+2} \ldots w_{m+1} | T_i)}{\max_{j \neq i} P(w_{m-k+2} \ldots w_{m+1} | T_j)}$$

where $T_j$ is the j-th topic in said battery, where k is the number of words in said word string, where said current word is $w_{m+1}$, where said prior word is $w_{m-k+2}$, where $P([\ldots]|T_i)$ is said likelihood measure for a string of words [ . . . ] in a context of topic $T_i$, where $\max_{j \neq i} P([\ldots]|T_j)$ is a maximum value of said likelihood measure over all topics $T_j$ in said battery except topic $T_i$, and where $R_i$ is computed for all values l=m+1, m, . . . , m-k+2.

12. The method of claim 11 wherein said likelihood measure is computed using t-gram language models.

13. An apparatus for real time identification of topics in text, comprising:
  means for forming a battery of topics from training data;
  means for detecting topic changes in said text, using said battery and a first threshold ratio;
  means for identifying topics in said text, using said battery and a second threshold ratio;
  wherein said detecting and identifying means are applied to said text in real time, wherein said first and second threshold ratios compare a metric having a likelihood measure, and wherein a topic can be identified for a current segment of said text prior to detecting a topic change in said segment.

14. The apparatus of claim 13, wherein said first and second threshold ratios are determined from said training data.

15. The apparatus of claim 13, wherein said first and second threshold ratios are estimated theoretically.

16. The apparatus of claim 13 wherein said identifying step performs translation of segmented text using topic labeling of each segment.

17. The apparatus of claim 13, wherein said detecting means further comprises:

means for successively looking backward from a current word to a prior word, beginning where said prior word is said current word, wherein for each step in said succession a determination is made whether a comparative topic metric is greater than said first threshold ratio, said metric including some likelihood measure that a word string from said current word to said prior word will be found in a context of a topic in said battery, not including a neutral topic;

wherein if said determination is YES, said prior word is declared an onset point of a new topic different from a current topic;

wherein if said determination is NO, said prior word is moved back one word and said succession is repeated until said prior word is a regeneration point;

wherein if all said successive determinations are less than one, said current word is declared a new regeneration point, and otherwise said current word is advanced by one word and said successive determinations are repeated.

18. The apparatus of claim 17, wherein said likelihood measure for said word string is calculated for the most likely and next most likely topics of said battery, and said comparative topic metric is the ratio of said next most likely measure to said most likely measure.

19. The apparatus of claim 17, wherein said comparative topic metric is $$S_k = \sum_{i=0}^{k-1} \ln \frac{\hat{p}_{m-i+1}}{p_{m-i+1}^{(T_j)}}$$

where $T_j$ is said current topic in said battery, where k is the length of said word string, where said current word is m+1 (at i=0), where said prior word is m−k+2 (at i=k−1), where $P^{(T_j)}_{m-i+1}$ is said likelihood measure for the single word located i words prior to said current word, and where $$\hat{p}_{m-i+1} = \frac{\text{number of times said single word appeared in said word string}}{\text{number of words in said word string}}.$$

20. The apparatus of claim 17, wherein said identifying means further comprises:

means for verifying whether said new topic associated with said word string beginning with said onset point is in said battery;

means for either switching to said neutral topic if said new topic is not in said battery, or determining whether a second comparative topic metric is greater than said second threshold ratio for a topic in said battery other than said current topic;

wherein if said determination is YES, said topic is declared to be the new topic, and wherein if said determination is NO, a word is added to said word string and said identification step is repeated.

21. The apparatus of claim 20, wherein said verifying means further comprises:

means for computing for said word string and for every topic in said battery $$S_{(j)} = \sum_{i=0}^{k-1} \ln \frac{\hat{p}_{m-i+1}}{p_{m-i+1}^{(T_j)}}$$

where $T_j$ is the j-th topic in said battery, where k is the number of words in said word string, where said current word is m+1 (at i=0), where said prior word is m−k+2 (at i=k−1), where $P^{(T_j)}_{m-i+1}$ is said likelihood measure for the single word located i words prior to said current word, and where $$\hat{p}_{m-i+1} = \frac{\text{number of times said single word appeared in said word string}}{\text{number of words in said word string}}.$$

means for determining whether $S_{(j)}$ is greater than said first threshold ratio for every topic j in said battery.

22. The apparatus of claim 20, wherein said identification determining means farther comprises:

means for computing for said word string $$R_i = \frac{P(w_l \ldots w_{m+1} | T_i)}{\max_{j \neq i} P(w_l \ldots w_{m+1} | T_j)}$$

where l=m+1, m, . . . , m−k+2;

means for determining whether for some topic $T_i$ in said battery, other than said current topic, $R_i$ is greater than said second threshold ratio.

23. The apparatus of claim 20, wherein said second comparative topic metric is $$R_i = \frac{P(w_{m-k+2} \ldots w_{m+1} | T_i)}{\max_{j \neq i} P(w_{m-k+2} \ldots w_{m+1} | T_j)}$$

where $T_j$ is the j-th topic in said battery, where k is the number of words in said word string, where said current word is $w_{m+1}$, where said prior word is $w_{m-k+2}$, where $P([\ldots]|T_i)$ is said likelihood measure for a string of words [ . . . ] in a context of topic $T_i$, where $\max_{j \neq i} P([\ldots]|T_j)$ is a maximum value of said likelihood measure over all topics $T_j$ in said battery except topic $T_i$, and where $R_i$ is computed for all values l=m+1, m, . . . , m−k+2.

24. The apparatus of claim 23 wherein said likelihood measure is computed using t-gram language models.

* * * * *